E. OLSON.
WAGON BODY.
APPLICATION FILED FEB. 18, 1914.
1,099,718.
Patented June 9, 1914.
2 SHEETS—SHEET 1.
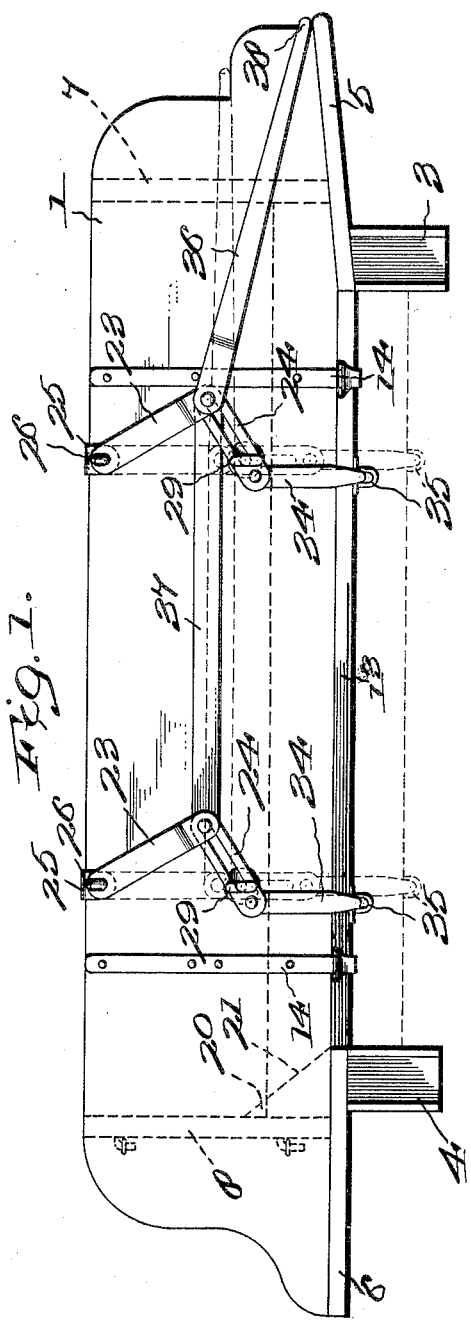
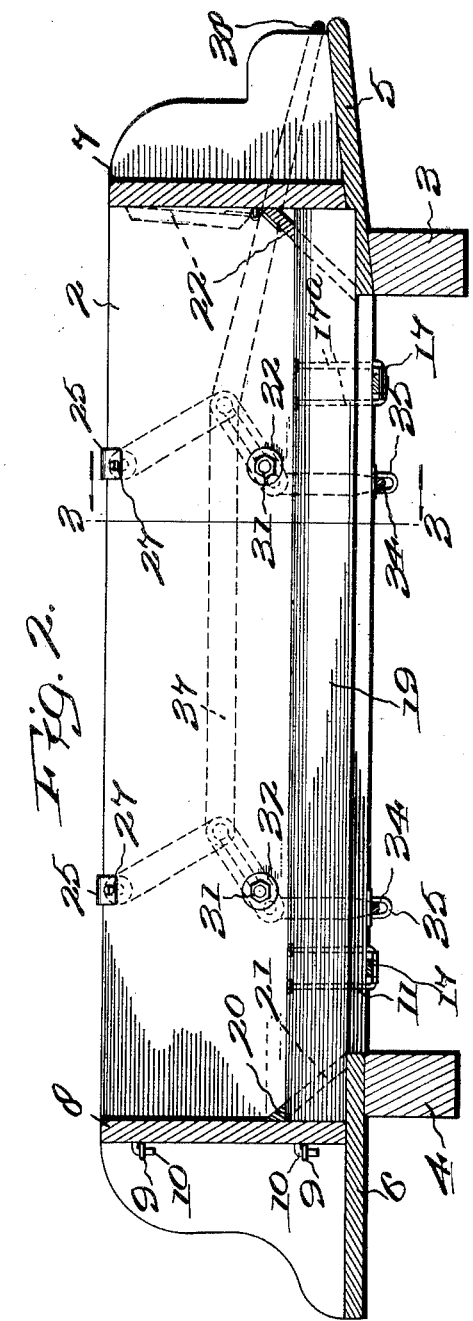
Witnesses
Edwin J Beller
H. H. Byrne
Inventor
Emil Olson,
by Wilkinson, Ginsta & Mackay
Attorneys

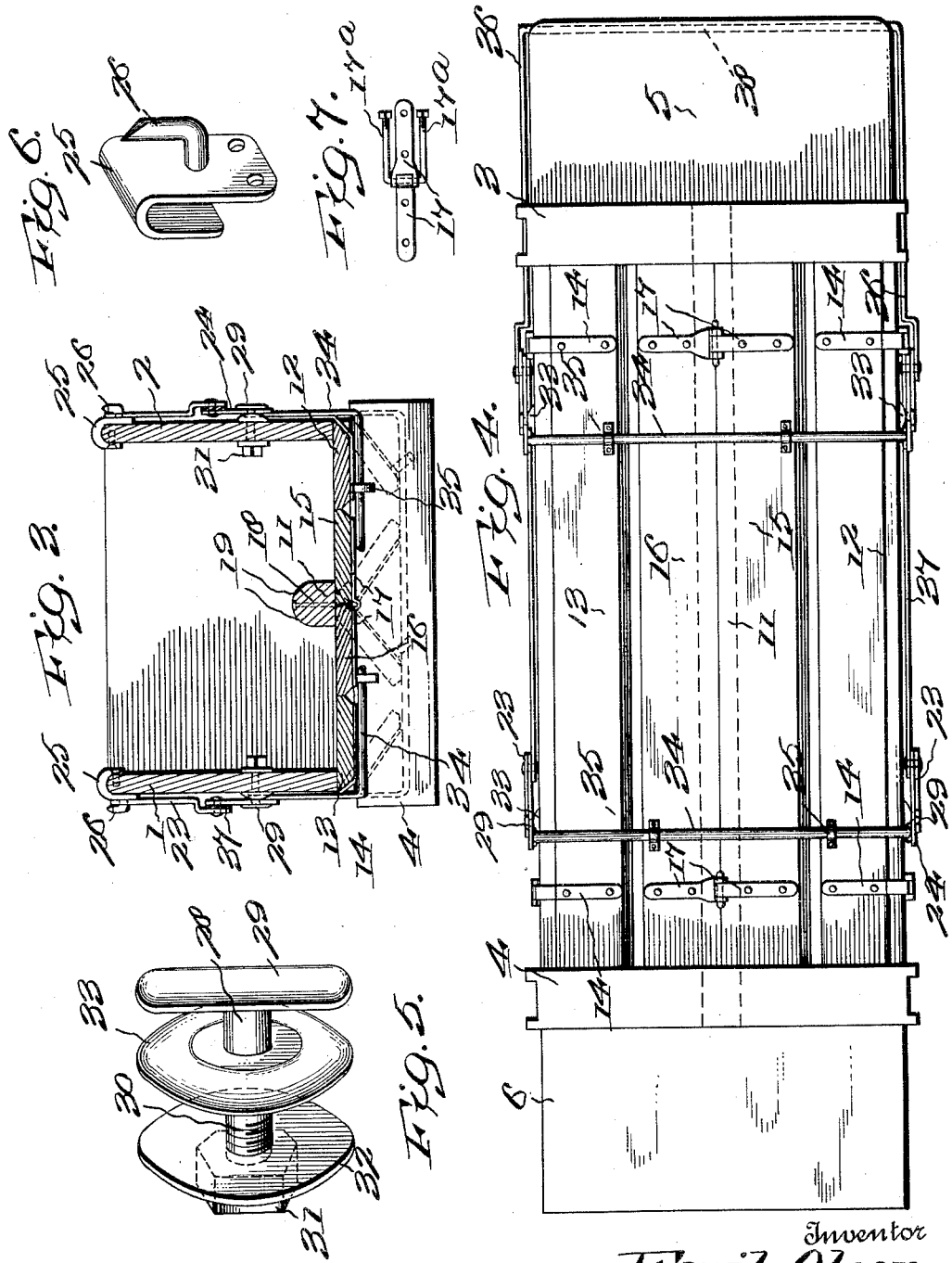

UNITED STATES PATENT OFFICE.

EMIL OLSON, OF ROCKFORD, ILLINOIS.

WAGON-BODY.

1,099,718.  Specification of Letters Patent.  Patented June 9, 1914.

Application filed February 18, 1914. Serial No. 819,472.

*To all whom it may concern:*

Be it known that I, EMIL OLSON, a citizen of the United States, residing at Rockford, in the county of Winnebago and State of Illinois, have invented certain new and useful Improvements in Wagon-Bodies; and I do hereby declare the following to be a full, clear, and exact description of the invention, such as will enable others skilled in the art to which it appertains to make and use the same.

The present invention relates to wagons, and has for its purpose to provide a combination dumping and lumber wagon body wherein the same may be suited to either of their respective requirements by a slight alteration in the body structure; and one in which the necessary alteration may be made in a simple and easily performed manner.

The invention has for its further purpose to provide a dumping wagon body of the drop-bottom type, in which the operating mechanism therefor forms one element of a locking device for securely holding the bottom against accidental release.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a side elevational view of the wagon body. Fig. 2 is a longitudinal sectional view thereof. Fig. 3 is a transverse sectional view of the same taken on the line 3—3 of Fig. 2. Fig. 4 is a bottom plan view. Figs. 5 and 6 are detail perspective views of parts of the wagon bottom operating mechanism. Fig. 7 is a detail view of one of the hinges.

Referring to the construction in further detail, the body consists of a pair of side members 1 and 2 that are rigidly mounted on the pair of cross beams 3 and 4, through the medium of the front and rear bottom sections 5 and 6, respectively. An end gate 7 is mounted on the bottom section 5 and is secured to the side members 1 and 2 in any approved manner. A rear end gate 8 in like manner extends transversely of the body and is removably mounted therein through the medium of eye members 9 that are engaged by hooks 10, carried by said end gate after the manner illustrated in Figs. 1 and 2.

A beam 11 connects the cross beams 3 and 4 longitudinally of and midway between the side sections 1 and 2, (see Fig. 4).

The dumping or drop bottom comprises two outer sections 12 and 13 that are mounted on strap hinges 14 secured to the side sections, and two inner sections 15 and 16 that are similarly mounted on strap hinges 17 secured to the longitudinal beam 11 by U-shaped bolts 17ª. The respective pairs of hinged sections (12, 13, 15 and 16) are adapted to swing from their normal or closed position to the position indicated in Fig. 3, for the purpose of dumping the load, as will be clearly understood.

To readily facilitate the dumping of the load in the wagon body the middle beam 11 is constructed with an upwardly projecting portion 18 having oppositely curved surfaces 19 that meet with the movable bottom sections 15 and 16 when the latter are in closed position. A member 20, having an inclined surface 21, is secured to and forms a part of the removable end gate 8. And a member 22 is hingedly mounted to the front end gate 7 and swings to engage with the wagon bottom on an incline for the object above mentioned. The purpose of mounting the member 22 to swing as described will be presently stated.

The bottom supporting and actuating mechanism consists of two pairs of pivotally connected links (23 and 24) that are swingingly supported to the side members 1 and 2 through the medium of hooks 25 that overlie the upper side edges (see Fig. 3) and are provided with projecting portions 26 that engage within suitably formed apertures in the link members 23. Said hooks 25 are secured in set position on the body sections 1 and 2 by means of screws 27. The link members 24 have each slotted engagement with a stud 28 having a retaining member or head 29, and the several studs form guides for directing the movements of said links when the latter are actuated. Each stud 28 is formed with a threaded shank 30 that passes through the side section to receive a clamping nut and washer 31 and 32, respectively, and said shank is further formed with a flange 33 adapted to clamp against the outer surface of the side section as shown. The slotted links 24 of each opposite pair of links have secured thereto a U-shaped supporting bar 34, that extends across and beneath the drop bottom and engages with the respective movable sections thereof through bearing members 35. Said members 35 act to hold the bottom supporting bars 34 against any tendency of movement longitudinally of the body during the running of the vehicle or action of the supporting links.

A loop bar 36 is connected to the front pair of links (23 and 24) and extends transversely of the body and about the sides thereof, as in the manner indicated in Figs. 1 and 4. And a pair of bars 37 connects the pairs of links on each side section to the end that the several links may be operated in unison through the manipulation of the loop bar 36, which acts after the manner of a lever for releasing and closing the drop bottom. In its normal position the lever 36 has engagement with the side sections 1 and 2, as indicated at 38 (Figs. 1 and 2) when the pairs of links 23 and 24 are held against action and consequently the bottom sections locked in closed position. To release the bottom it is necessary only that the lever 36 be raised from engaging position, as shown in Fig. 2, and moved to the position shown in Fig. 1, when the supporting bars 34 will be lowered and the bottom sections opened, as indicated in Fig. 3.

In order that the body may be converted from its construction as a dumping vehicle to that of a lumber or like vehicle, the end gate 8, together with the attached member 20, may be removed, and the front section 22 raised to that position indicated in Fig. 2. The vehicle may then be loaded and unloaded from the rear end after the usual manner.

It is obvious that those skilled in the art may vary the details of construction and arrangement of parts without departing from the spirit of my invention, and therefore I do not wish to be limited to such features except as may be required by the claims.

I claim:

1. In a dumping wagon-body the combination of side members; swingingly mounted sections forming a dumping bottom; links mounted on said side members; rods connecting the respective links of said side members; bars engaging with said links and providing supporting members for said bottom sections; and a lever pivotally connected to a pair of links on said side members for actuating said supporting bars to operate said bottom sections; and said lever adapted to engage with said side members to lock said bottom sections, substantially as described.

2. In a dumping wagon-body the combination of side members; swingingly mounted sections forming a dumping bottom; pivotally connected pairs of links mounted on said side members, and one member of each pair of links formed with a slot; pins secured to the side members and engaging within said slots and forming guides for said links; rods connecting the respective pairs of links on said side members; bars mounted on said slotted links and providing supporting members for said swinging bottom sections; and a lever pivotally connected to a pair of links on said side members and extending across the wagon body, said lever adapted to engage with said side members to lock said bottom sections, substantially as described.

3. In a dumping wagon-body the combination of side members; a beam disposed longitudinally of and between said side members; a pair of outer bottom sections hingedly mounted on said side members; a pair of inner bottom sections hingedly mounted on said longitudinal beam; pairs of pivotally connected links mounted on said side members; U-shaped bars depending from the pairs of links on opposite sides of said side members and engaging with said hingedly mounted bottom sections; bars connecting the pairs of links on each of said side members; and a looped lever connecting two opposite pairs of links on said side members whereby to manipulate the bottom sections, and said looped lever adapted to engage with said side members and lock said bottom sections in closed position, substantially as described.

4. In a convertible wagon-body the combination of side members; swinging sections forming a dumping bottom; means for actuating said swinging sections; a front end gate fixedly mounted between said side members; a section hingedly mounted on said front end gate and providing an inclined supporting section for the dumping bottom; and an end gate removably mounted between said side members and formed with an inclined supporting section for the dumping bottom; said last named end gate adapted to be removed, and said hingedly mounted section adapted to be raised whereby to convert the wagon body, substantially as described.

In testimony whereof, I affix my signature, in presence of two witnesses.

EMIL OLSON.

Witnesses:
CHAS. E. GUNNER,
W. L. JORDAN.

---

Copies of this patent may be obtained for five cents each, by addressing the "Commissioner of Patents, Washington, D. C."